US012634083B2

(12) United States Patent
Rupasinghe et al.

(10) Patent No.: US 12,634,083 B2
(45) Date of Patent: May 19, 2026

(54) METHODS OF CSI-RS ASSISTED PARTIAL FREQUENCY SOUNDING WITH SRS

(71) Applicants: NTT DOCOMO, INC., Tokyo (JP); DOCOMO INNOVATIONS. INC., Palo Alto, CA (US)

(72) Inventors: Nadisanka Rupasinghe, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 299 days.

(21) Appl. No.: 18/271,262

(22) PCT Filed: Jan. 21, 2022

(86) PCT No.: PCT/US2022/013370
§ 371 (c)(1),
(2) Date: Jul. 7, 2023

(87) PCT Pub. No.: WO2022/159740
PCT Pub. Date: Jul. 28, 2022

(65) Prior Publication Data
US 2024/0056257 A1      Feb. 15, 2024

Related U.S. Application Data

(60) Provisional application No. 63/140,563, filed on Jan. 22, 2021.

(51) Int. Cl.
H04L 5/00          (2006.01)
(52) U.S. Cl.
CPC .......... H04L 5/0051 (2013.01); H04L 5/0098 (2013.01)

(58) Field of Classification Search
None
See application file for complete search history.

(56) References Cited

U.S. PATENT DOCUMENTS

| | | |
|---|---|---|
| 2013/0078913 A1 | 3/2013 | Lee et al. |
| 2020/0059384 A1* | 2/2020 | Zhang ................... H04L 5/0023 |
| 2022/0159700 A1 | 5/2022 | Maleki et al. |
| 2022/0231810 A1 | 7/2022 | Matsumura et al. |
| 2023/0239088 A1* | 7/2023 | Gao ...................... H04L 5/0051 |
| | | 370/329 |

(Continued)

FOREIGN PATENT DOCUMENTS

| | | |
|---|---|---|
| JP | 2013530644 A | 7/2013 |
| WO | 2020204800 A1 | 10/2020 |
| WO | 2020246014 A1 | 12/2020 |

OTHER PUBLICATIONS

Office Action issued in Japanese Application No. 2023-544234, mailed Dec. 24, 2024 (9 pages).

(Continued)

*Primary Examiner* — Diane L Lo
(74) *Attorney, Agent, or Firm* — Osha Bergman Watanabe & Burton LLP

(57) ABSTRACT

A wireless communication method is disclosed that includes receiving, via downlink control information (DCI) or higher layer signaling, configuration information for a. Sounding Reference Signal (SRS) configuration and configuring one or more SRS resources for partial or full frequency sounding based on the configuration information. In other aspects, a terminal and a wireless communication system are also disclosed.

5 Claims, 8 Drawing Sheets

(56) References Cited

U.S. PATENT DOCUMENTS

2023/0254832 A1* 8/2023 Sen ....................... H04L 5/0051
370/329

OTHER PUBLICATIONS

International Search Report issued in PCT/US2022/013370 on May 17, 2022 (3 pages).

Written Opinion of the International Searching Authority issued in PCT/US2022/013370 on May 17, 2022 (8 pages).

Fraunhofer IIS, Fraunhofer HHI; "Enhancements on SRS for coverage and capacity"; 3GPP TSG RAN WG1 #104-e, R1-2101684; e-Meeting; Jan. 25-Feb. 5, 2021 (4 pages).

Qualcomm Incorporated; "Discussion on SRS enhancement"; 3GPP TSG-RAN WG1 Meeting #104-e, R1-2101451; e-Meeting; Jan. 25-Feb. 5, 2021 (41 pages).

Ntt Docomo, Inc.; "Discussion on SRS enhancement"; 3GPP TSG RAN WG1 #104-e, R1-2101602; e-Meeting; Jan. 25-Feb. 5, 2021 (13 pages).

Samsung; "New WID: Further enhancements on MIMO for NR"; 3GPP TSG RAN Meeting #86, RP-193133; Sitges, Spain; Dec. 9-12, 2019 (14 pages).

Qualcomm Incorporated; "Discussion on SRS enhancement"; 3GPP TSG-RAN WG1 Meeting #103-e, R1-2009255; e-Meeting; Oct. 26-Nov. 13, 2020 (31 pages).

Office Action issued in European Patent Application No. 22704107.6, mailed Jun. 3, 2025 (9 pages).

Ericsson: "SRS Performance and Potential Enhancements"; 3GPP TSG-RAN WG1 Meeting #104-e, Tdoc R1-2101519, e-Meeting, Jan. 25 -Feb. 5, 2021 (26 pages).

3GPP TS 38.211 V16.4.0; "3rd Generation Partnership Project; Technical Specification Group Radio Access Network; NR; Physical channels and modulation (Release 16)"; Dec. 2020 (133 pages).

3GPP TS 38.331 V15.12.0; "3rd Generation Partnership Project; Technical Specification Group Radio Access Network; NR; Radio Resource Control (RRC) protocol specification (Release 15)"; Dec. 2020 (541 pages).

Office Action issued in Japanese Application No. 2023-544234, dated Jul. 30, 2024 (11 pages).

3GPP TSG RAN WG1 #103-e; R1-2008956; MediaTek Inc.; "Enhancement on multi-beam operation"; e-Meeting, Oct. 26-Nov. 13, 2020 (19 pages).

Office Action issued in Chinese Patent Application No. 202280010725.1, dated Aug. 14, 2025 (13 pages).

* cited by examiner

Partial Frequency Sounding with SRS

Within each hop, SRS transmission is done over half of the available bandwidth

12 RBs

Slot $t$ $f$

Partial SRS Configuration

Legacy SRS Transmission

$(C_{SRS} = 24, b_{hop} = 0, B_{SRS} = 2, N^{SRS}_{symb} = 4[2])$

24 RBs

Slot $t$ $f$

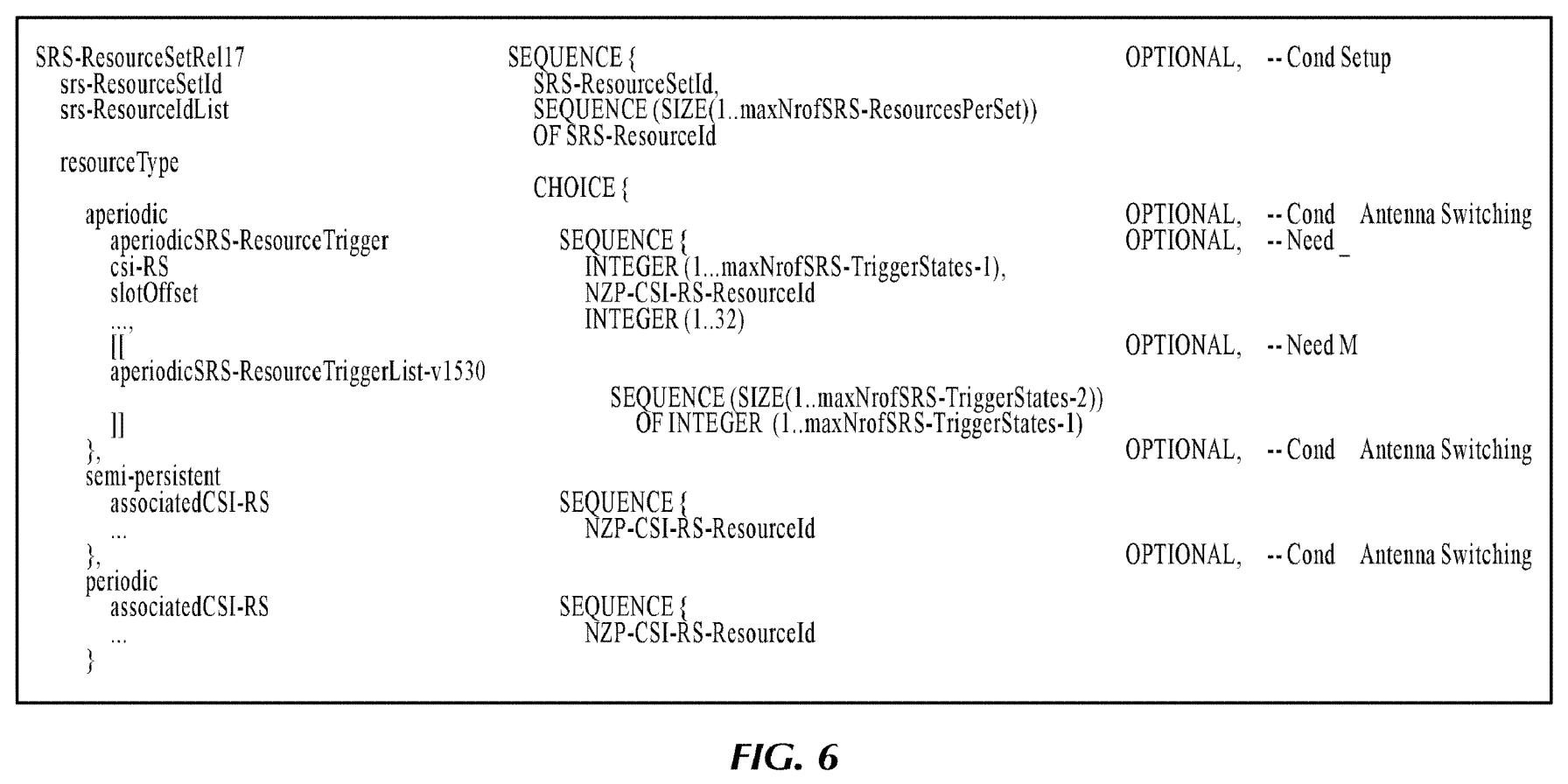

```
SRS-ResourceSetRel17          SEQUENCE {
  srs-ResourceSetId             SRS-ResourceSetId,
  srs-ResourceIdList            SEQUENCE (SIZE(1..maxNrofSRS-ResourcesPerSet))
                                OF SRS-ResourceId                   OPTIONAL,    -- Cond Setup resourceType                  CHOICE { aperiodic                   SEQUENCE {
      aperiodicSRS-ResourceTrigger  INTEGER (1..maxNrofSRS-TriggerStates-1),    OPTIONAL,    -- Cond  Antenna Switching
      csi-RS                        NZP-CSI-RS-ResourceId                        OPTIONAL,    -- Need _
      slotOffset                    INTEGER (1..32)                              OPTIONAL,    -- Need M
      ...,
      aperiodicSRS-ResourceTriggerList-v1530
                                    SEQUENCE (SIZE(1..maxNrofSRS-TriggerStates-2))
                                    OF INTEGER  (1..maxNrofSRS-TriggerStates-1)  OPTIONAL,    -- Cond  Antenna Switching
    },
    semi-persistent             SEQUENCE {
      associatedCSI-RS              NZP-CSI-RS-ResourceId                        OPTIONAL,    -- Cond  Antenna Switching
      ...
    },
    periodic                    SEQUENCE {
      associatedCSI-RS              NZP-CSI-RS-ResourceId
      ...
    }
```

*FIG. 6*

METHODS OF CSI-RS ASSISTED PARTIAL FREQUENCY SOUNDING WITH SRS

TECHNICAL FIELD

One or more embodiments disclosed herein relate to mechanism(s) to enhance Sounding Reference Signal (SRS) capacity and/or coverage by considering Channel State Information Reference Signal (CSI-RS) assisted partial sounding across a frequency spectrum.

DESCRIPTION OF RELATED ART

In 5G new radio (NR) technologies, new requirements are being identified for further enhancing SRS transmission. New items in Rel. 17 relate to, for example, NR Multiple-Input-Multiple-Output (MIMO).

In the new studies being conducted, enhancement of the SRS is targeted for both Frequency Range (FR) 1 and FR2. In particular, study is under way to identify and specify enhancements on aperiodic SRS triggering to facilitate more flexible triggering and/or Downlink Control Information (DCI) overhead/usage reduction.

Additionally, study is under way to specify SRS switching for up to 8 antennas (e.g., xTyR, x={1, 2, 4} and y={6, 8}). Further, studies are evaluating and, if needed, specifying the following mechanism(s) to enhance SRS capacity and/or coverage including SRS time bundling, increased SRS repetition, and/or partial sounding across frequency.

CITATION LIST

Non-Patent References

[Non-Patent Reference 1] 3GPP RP 193133, "New WID: Further enhancements on MIMO for NR", December 2019.
[Non-Patent Reference 2] 3GPP TS 38.211, "NR; Physical channels and modulation (Release 16)."
[Non-Patent Reference 3] 3GPP RAN #1 E-meeting #104e, R1-2009255, "Discussion on SRS enhancement", November, 2020.
[Non-Patent Reference 4] 3GPP TS 38.331, "NR; Radio Resource Control; Protocol specification (Release 15)."

SUMMARY

In one or more embodiments, a wireless communication method includes receiving, via downlink control information (DCI) or higher layer signaling, configuration information for a Sounding Reference Signal (SRS) configuration and configuring one or more SRS resources for partial or full frequency sounding based on the configuration information.

In one aspect, the wireless communication method further includes associating, one or more Channel State Information—Reference Signal (CSI-RS) resources with the one or more SRS resources.

In one aspect, the one or more CSI-RS resources and the one or more SRS resources are associated based on the configuration information.

In one aspect, the configuration information is signaled by Radio Resource Control (RRC) signaling.

In one aspect, the configuration information is dynamically updated by the DCI.

In one aspect, the configuration information is dynamically updated by a Medium Access Control Control Element (MAC-CE).

In one aspect, the wireless communication method further includes activating the one or more SRS resources for transmission, precoding one or more SRSs for the one or more SRS resources, and transmitting the one or more SRSs.

In one aspect, the wireless communication method further includes deactivating the one or more SRS resources for transmission.

In one or more embodiments, a terminal includes a receiver that receives, via downlink control information (DCI) or higher layer signaling, configuration information for a Sounding Reference Signal (SRS) configuration and a processor that configures one or more SRS resources for partial or full frequency sounding based on the configuration information.

In one or more embodiments, a wireless communication system includes a terminal that has a receiver that receives, via downlink control information (DCI) or higher layer signaling, configuration information for a Sounding Reference Signal (SRS) configuration; and a processor that configures one or more SRS resources for partial or full frequency sounding based on the configuration information. The wireless communication system further includes a base station that has a transmitter that transmits the configuration information.

Other embodiments and advantages of the present invention will be recognized from the description and figures.

BRIEF DESCRIPTION OF THE DRAWINGS

FIG. 6 shows an example of association(s) of CSI-RS resource(s) with SRS resource(s).

DETAILED DESCRIPTION

Figure 1:
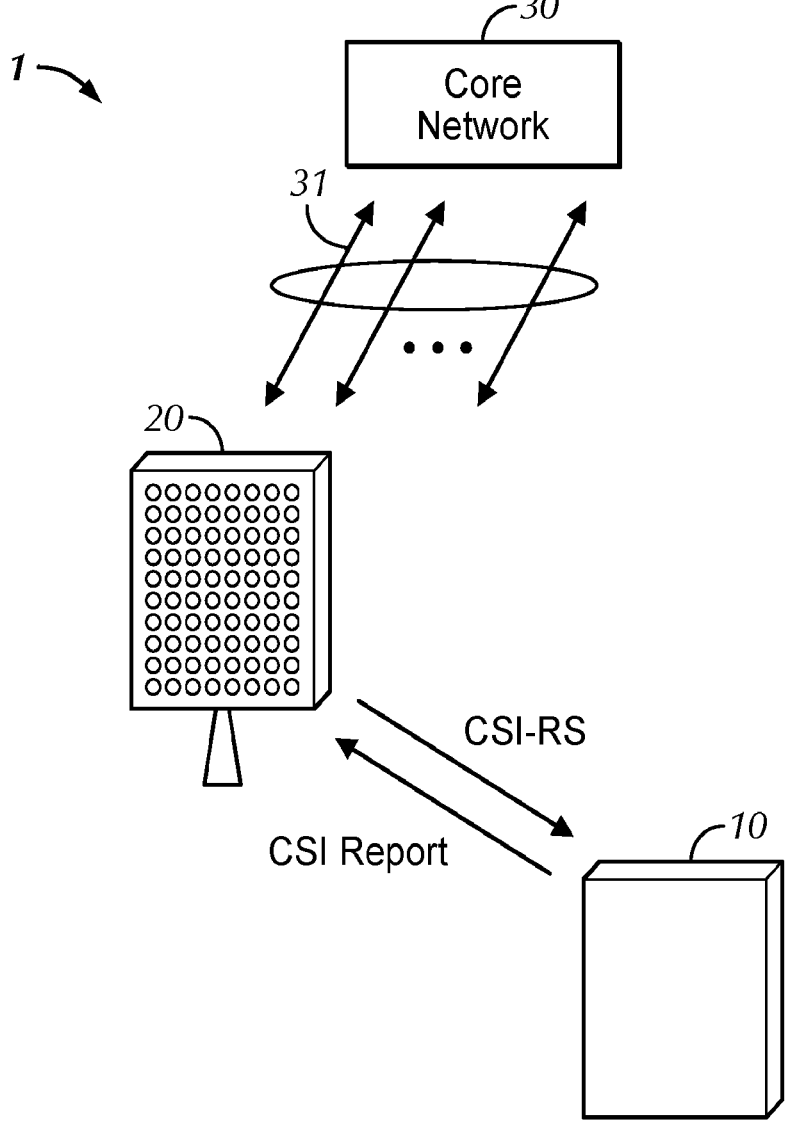
FIG. 1 is a diagram showing a schematic configuration of a wireless communications system according to embodiments.

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 describes a wireless communications system 1 according to one or more embodiments of the present invention. The wireless communication system 1 includes a user equipment (UE) 10, a base station (BS) 20, and a core network 30. The wireless communication system 1 may be a NR system. The wireless communication system 1 is not limited to the specific configurations described herein and may be any type of wireless communication system such as an LTE/LTE-Advanced (LTE-A) system.

The BS 20 may communicate uplink (IL) and downlink (DL) signals with the UE 10 in cell of the 13S 20. The DL and UL signals may include control information and user data. The BS 20 may communicate DL and UL signals with the core network 30 through backhaul links 31. The BS 20 may be gNodeB (gNB). The BS 20 may be referred to as a network (N W) 20.

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the IE 10. Operations of the 13S 20 may be implemented by the processor processing or executing data and programs stored in a memory. However, the 13S 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more IEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by CPU processing or executing data and programs stored in a memory. However, the UE 10 is not limited to the hardware configuration set forth above and may be configured with, e.g., a circuit to achieve the processing described below.

As shown in FIG. 1, the 13S 20 may transmit a CSI-Reference Signal (CSI-RS) to the UE 10. In response, the IE 10 may transmit a CSI report to the BS 20. Similarly, the UE 10 may transmit SRS to the 13S 20.
(Configuration of BS)

Figure 2:
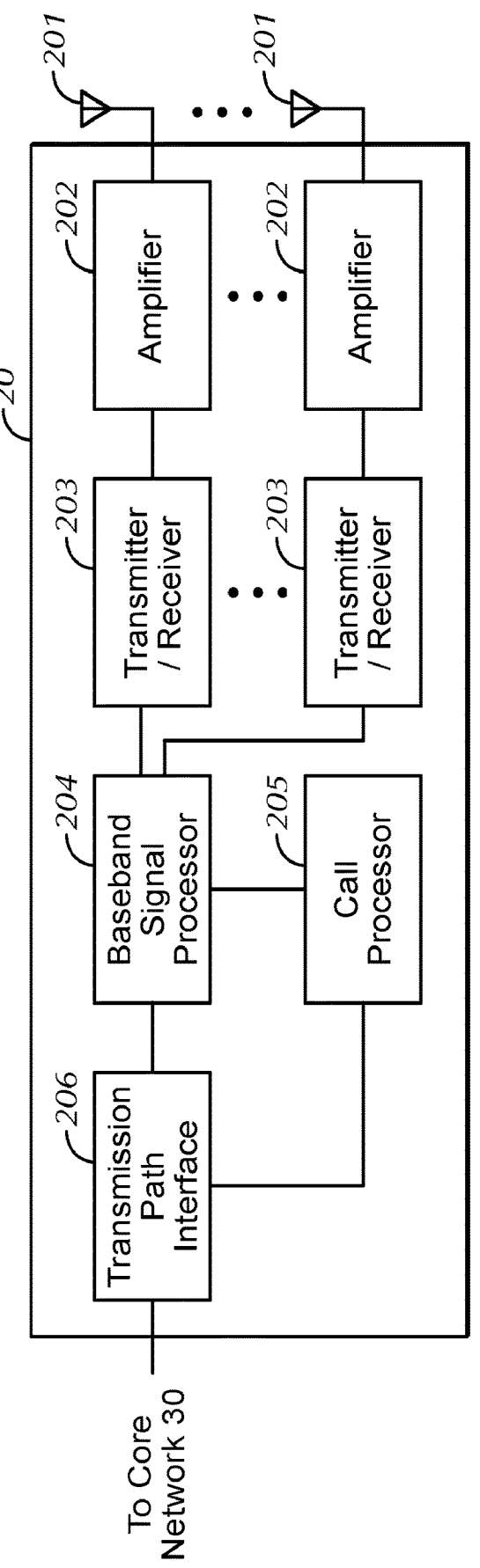
FIG. 2 is a diagram showing a schematic configuration of a U-E according to embodiments.

The BS 20 according to embodiments of the present invention will be described below with reference to FIG. 2. FIG. 2 is a diagram illustrating a schematic configuration of the BS 20 according to embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and pre-coding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., Radio Resource Control (RRC) signaling and broadcast channel). Information for communication in the cell includes, for example, UL or DL system bandwidth.

In each transceiver 203, baseband signals that are pre-coded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network through the transmission path interface 206. The call processor 205 performs call processing such as setting up and releasing a communication channel, manages the state of the BS 20, and manages the radio resources.
(Configuration of UE)

Figure 3:
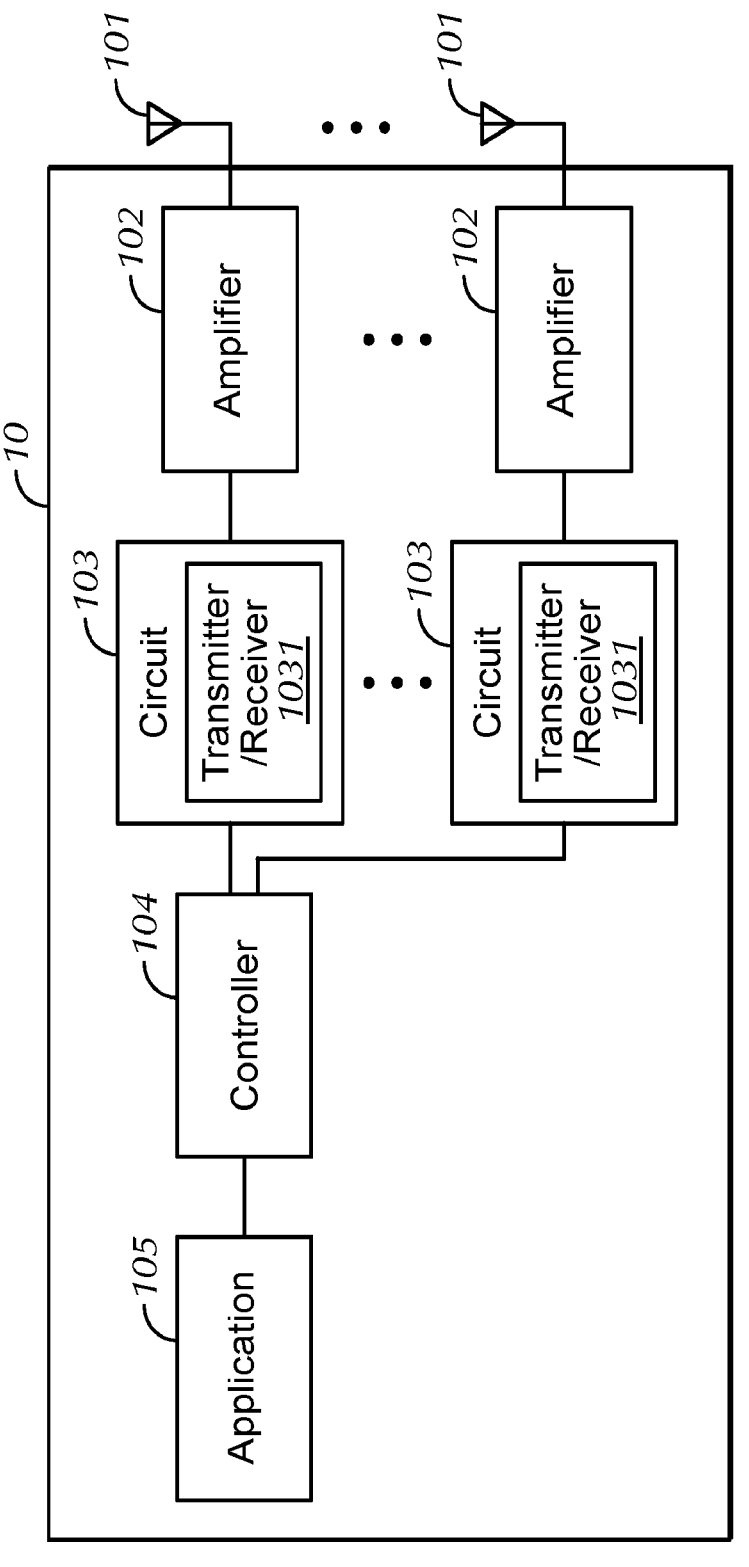
FIG. 3 is a schematic configuration of the UE 10 according to embodiments.

The UE 10 according to embodiments of the present invention will be described below with reference to FIG. 3. FIG. 3 is a schematic configuration of the HE 10 according to embodiments of the present invention. The HE 10 has a plurality of UE antenna S101, amplifiers 102, the circuit 103 comprising transceiver (transmitter/receiver) 1031, the controller 104, and an application 105.

As for DL, radio frequency signals received in the HE antenna S101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

As discussed above, studies are under way with regard to the enhancement of SRS. In one or more embodiments described herein may provide mechanisms to enhance SRS capacity and/or coverage by including SRS time bundling, increased SRS repetition, and/or partial sounding across frequency.

Figure 4:
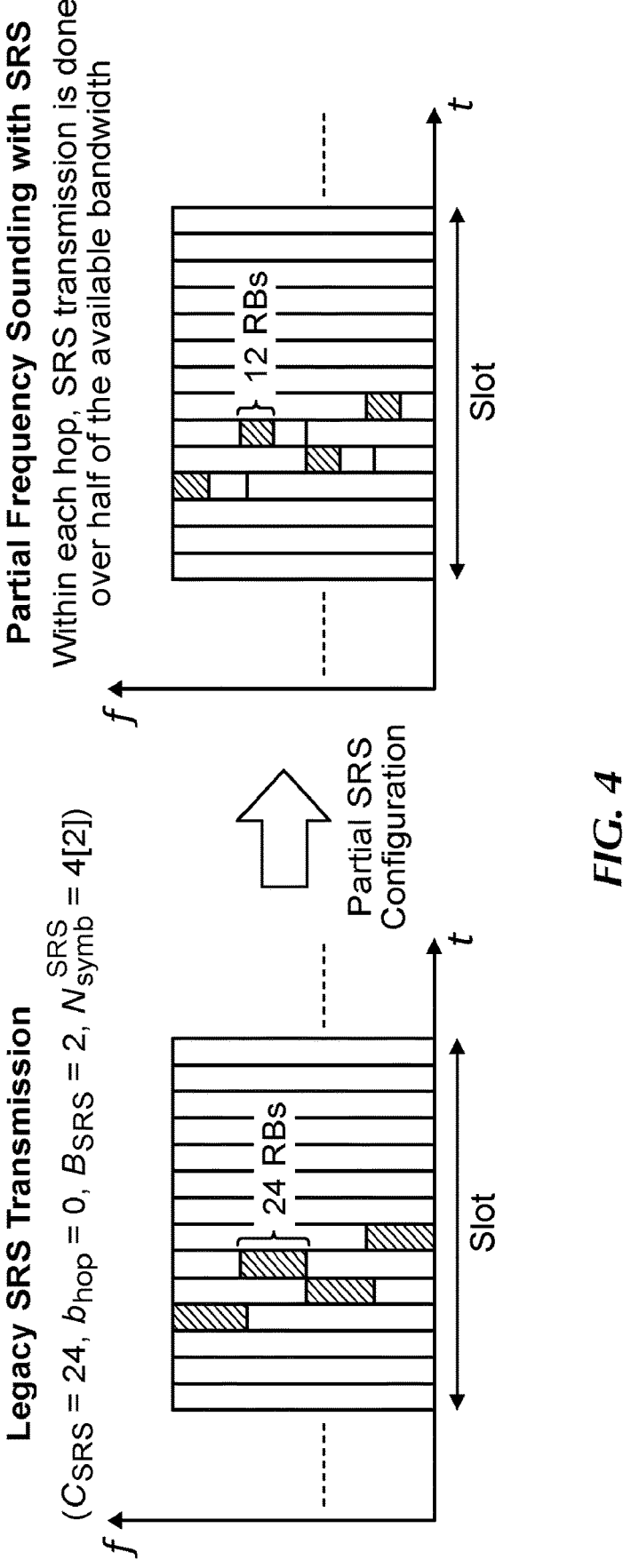
FIG. 4 shows an example of partial frequency sounding with SRS.

In one or more embodiments with reference to examples shown in FIG. 4, partial frequency sounding with SRS may be performed. One or more potential advantages of partial frequency sounding include the following possibilities.

Compared to full-band sounding, partial-band sounding (or partial-frequency sounding) provides a way to boost the per-subcarrier power since the available transmit power is allocated to a smaller bandwidth partition.

Further, it enhances the SRS capacity as it gives an opportunity for the network to multiplex more UE ports on the rest of frequency resource.

One or more potential disadvantages may be that since the entire band is not sounded from SRS transmission within a slot, frequency selective scheduling over the whole DL transmission bandwidth is not feasible. Further, due to partial frequency sounding, the NW may not be able to extract the interference structure of the channel.

One or more embodiments are now described with reference to examples shown in FIG. 5. As mentioned, due to partial frequency sounding, the NW may not be able to extract the interference structure of the channel. As a solution, in [3] it has been proposed to associate SRS resource(s) with a CSI-RS resource such that a UTE can measure the DL interference covariance using CSI-RS and precode SRS transmission accordingly.

Figure 5:
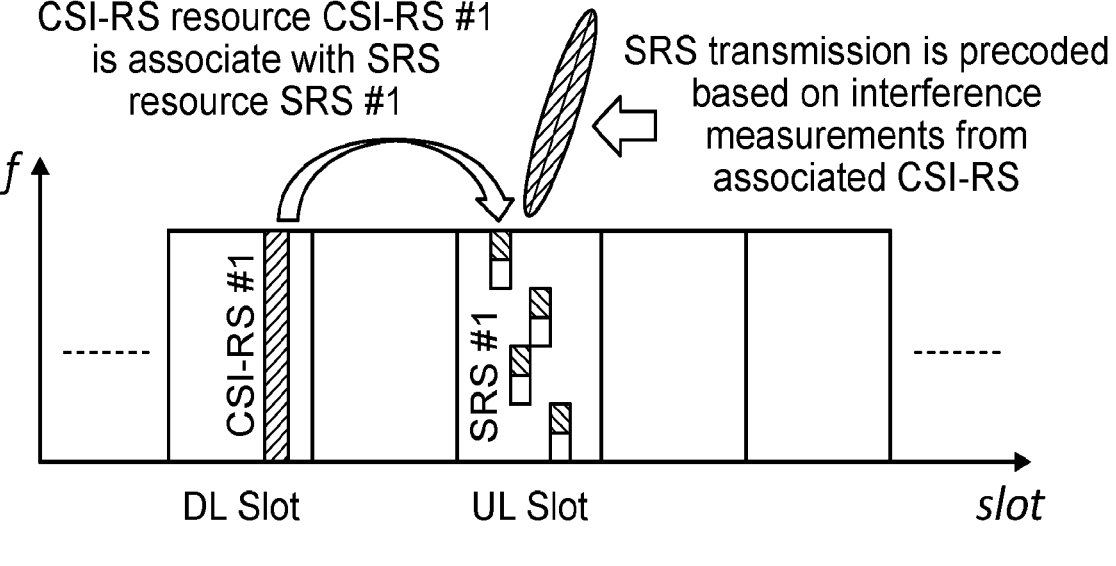
FIG. 5 shows an example CSI-RS assisted partial frequency sounding with SRS.

For example, as shown in FIG. 5, based on the DL interference measurements considering associated CSI-RS resource CSI-RS #1, the UE precodes SRS resource SRS #1 before it is transmitted such that the NW can get an idea about the interference condition at the UE.

It is noted that precoded SRS transmission can also be applied for full frequency sounding with SRS.

One or more embodiments relate to switching between full/partial frequency sounding with SRS. In particular, using higher-layer signaling or DCI, a UE is configured as to whether to consider partial/full bandwidth SRS transmission. For example, using DCI or higher-layer signaling, the UE is indicated as to whether to consider partial or full frequency sounding with SRS, i.e., x=0→full band; x=1→half of the available band.

With respect to dynamic switching, DCI can be used for dynamic switching between full/partial frequency sounding with SRS. In particular, one or more of the following options can be considered for dynamic switching using DCI.

As a first option, 1-bit is added to the DCI to enable the switching between partial/full frequency sounding with SRS. As a second option, SRS request field in DCI indicates an SRS resource. The indicated SRS resource includes necessary configurations for partial/full frequency sounding. In the case if dynamic switching between partial and full frequency sounding with SRS transmission the following may be considered. During dynamic switching, if partial frequency sounding is indicated, SRS is precoded considering interference information derived from an associated CSI-RS. Otherwise, SRS is not precoded considering interference information derived from an associated CSI-RS for partial frequency sounding.

If full frequency sounding is indicated, SRS is precoded considering interference information derived from associated CSI-RS for full frequency sounding. Otherwise, SRS is not precoded for full frequency sounding.

One or more embodiments in accordance with FIG. 6 relate to association of CSI-RS resource(s) with SRS resource(s). In particular, using higher-layer signaling or DCI, a UE is configured with the association between a CSI-RS resource and an SRS resource(s).

As a first option in accordance with one or more embodiments, consider that using RRC signalling, an SRS resource with usage set to 'Antenna Switching' is associated with CSI-RS resource for DL interference measurement purposes. In particular, the example shown in FIG. 6 shows a new RRC IE which can be used for such an association.

It is noted that if precoded SRS is only applicable for partial frequency sounding, the UE may not consider an associated CSI-RS resource for deriving DL interference information when full frequency sounding is configured.

As a second option in accordance with one or more embodiments, consider that using DCI or a MAC-CE, an association of CSI-RS resource with a particular SRS resource(s) may be dynamically updated/configured. For example, when requesting UL SRS transmission using DCI, the UE is configured with necessary CSI-RS association information. As another example, multiple CSI-RS resources may be associated with an SRS resource. Then, using DCI or a MAC-CE, the UE is updated/configured with a particular CSI-RS resource to be considered out of those CSI-RS resources.

Figures 7, 8:
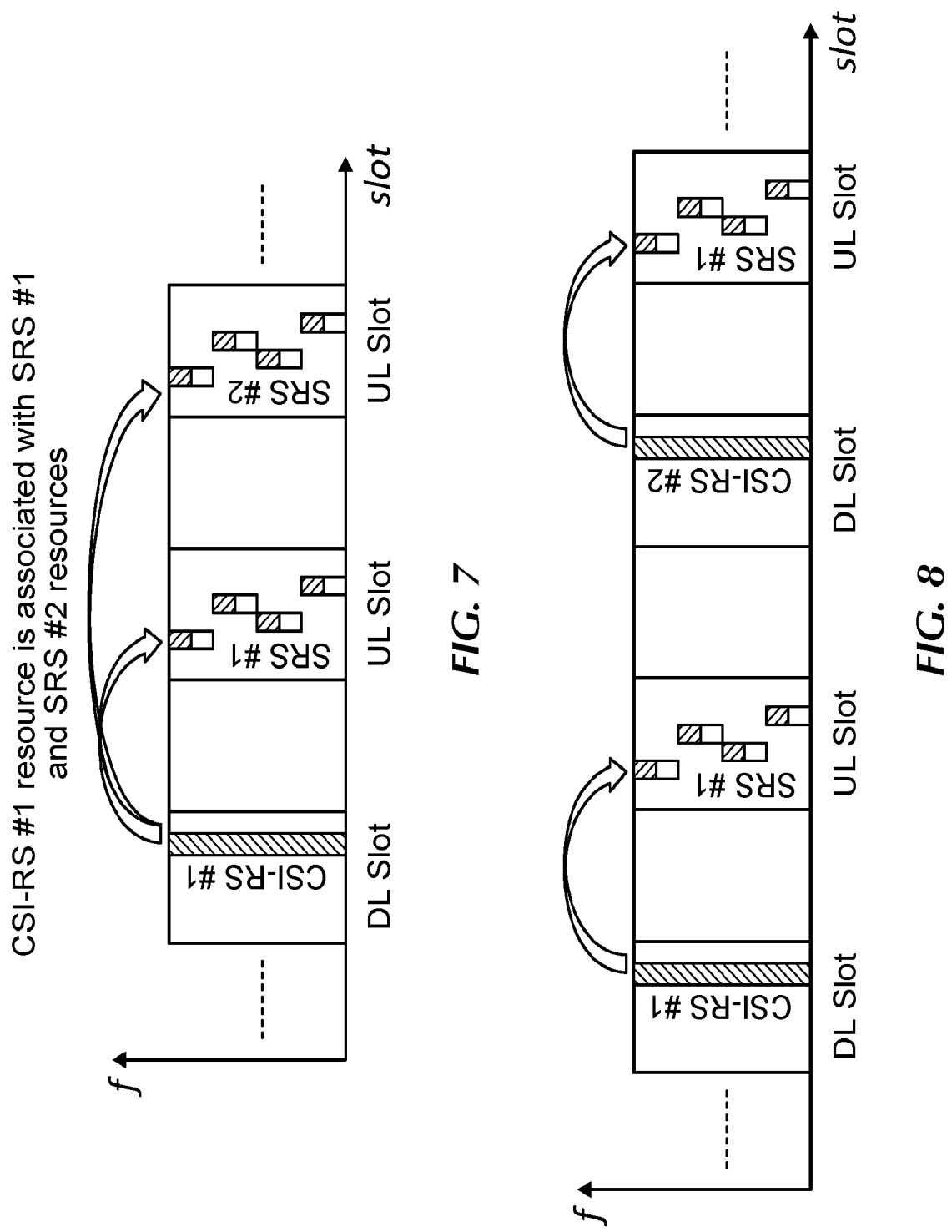
FIG. 7 shows an example of association(s) of CSI-RS resource(s) with SRS resource(s).
FIG. 8 shows an example of association(s) of CSI-RS resource(s) with SRS resource(s).

In accordance with examples of one or more embodiments shown in FIG. 7, consider that by using higher-layer signalling or DCI, a single CSI-RS resource can be associated with multiple SRS resources. For example, as shown in FIG. 7 CSI-RS #1 resource is associated with SRS #1 and SRS #2 resources of usage set to 'Antenna Switching.'

In accordance with another example of one or more embodiments shown in FIG. 8, consider that by using higher-layer signalling or DCI, multiple CSI-RS resources can be associated with a single SRS resource. For example, as shown in FIG. 8, the CSI-RS #1 and CSI-RS #2 resources are associated with SRS #1 resource of usage set to 'Antenna Switching.'

Figure 9:
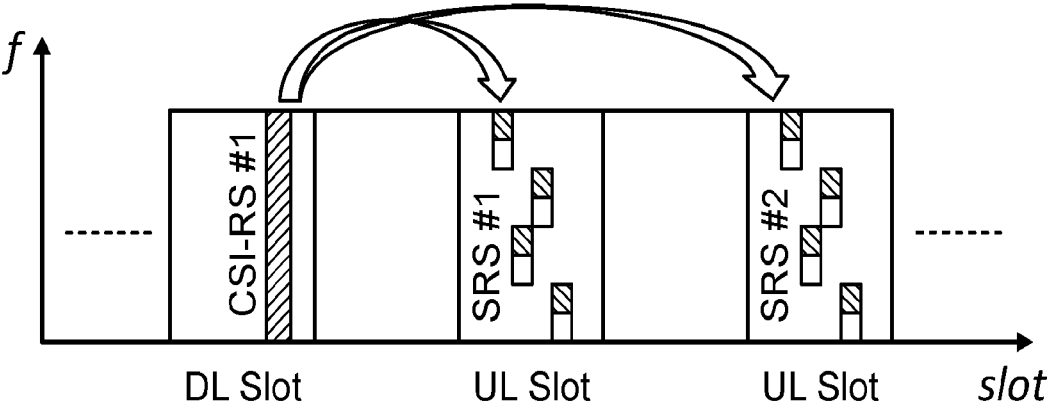
FIG. 9 shows an example of association(s) of CSI-RS resource(s) with SRS resource(s).

In accordance with another example one or more embodiments shown in FIG. 9, consider that by using higher-layer signalling or DCI, single CSI-RS resources can be associated with SRS resources of different usages. For example, as shown in FIG. 9, the CSI-RS #1 resource is associated with the SRS #1 resource of usage 'Antenna Switching' and SRS #2 resource of usage 'Non codebook.'

One or more embodiments relate to activating precoded SRS for partial/full frequency sounding. That is, using higher-layer signaling or DCI, a UE is indicated/activated as to whether to precode or not precode the SRS transmission for partial/full frequency sounding.

With respect to dynamic switching, DCI can be used for dynamically switching between precoding/not precoding the SRS transmission. In particular, one or more of the following options can be considered for dynamic switching using DCI.

In a first option in accordance with one or more embodiments, 1-bit is added to the DCI to activate/deactivate SRS precoding.

In a second option in accordance with one or more embodiments, an SRS request field in DCI indicates an SRS resource. The indicated SRS resource includes necessary configurations for SRS precoding/not precoding. For example, if the indicated SRS resource is associated with a CSI-RS resource, the UE precodes SRS transmission considering derived interference information from an associated CSI-RS resource, or else no precoding is done for SRS.

It is noted that for SRS precoder determination, interference measurements from associated CSI-RS resource(s) can be configured.

It is further noted that it is also possible that the precoder generation for SRS is based on some other mechanism/criteria without depending on the CSI-RS based interference measurements. For example, with reference to the first option in accordance with one or more embodiments, it may be considered that no CSI-RS resource is associated with the SRS resource. As another example with reference to the second option in accordance with one or more embodiments, it may be considered that the association of a CSI-RS resource with the SRS resource is configured. Subsequently, using higher layer signaling or DCI, the UE is indicated as to whether to consider the associated CSI-RS resource for SRS precoder determination.

Variation

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/present embodiments described in this specification, and other methods may be used as well. For example, reporting of information may be implemented by using physical layer signaling (for example, downlink control information (D), uplink control information (UCI), higher layer signaling (for example, RRC (Radio Resource Control) signaling, broadcast information (master information block (MIB), system information blocks (SiBs), and so on), MAC (Medium Access Control) signaling and so on), and other signals and/or combinations of these.

Software, whether referred to as "software" "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (LYE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/present embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations may have the functions of the user terminals described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-CG (Serving-Gateways), and so on may be possible, but these are not limiting) other than base stations, or combinations of these.

One or more embodiments illustrated in this specification may be used individually or in combinations, which may be switched depending on the mode of implementation. The order of processes, sequences, flowcharts, and so on that have been used to describe the aspects/present embodiments herein may be re-ordered as long as inconsistencies do not arise. For example, although various methods have been illustrated in this specification with various components of steps in exemplary orders, the specific orders that are illustrated herein are by no means limiting.

One or more embodiments illustrated in the present disclosure may be applied to LTE (Long Term Evolution), LTE-A (LT E-Advanced), LTE-B (LT E-Beyond), SUPER 3G, IMT-Advanced, 4G (4th generation mobile communication system), 5G(5th generation mobile communication system), FR A (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, assuming, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and 13 are different" may mean that "A and 13 are different from each other." The terms "separate," "be coupled" and so on may be interpreted similarly.

Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the invention defined by the recitations of claims. Consequently, the description in this specification is provided only for the purpose of explaining examples, and should by no means be construed to limit the invention according to the present invention in any way.

The above examples and modified examples may be combined with each other, and various features of these examples may be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A terminal comprising:
   a receiver that receives, via higher layer signaling, configuration information for a sounding reference signal (SRS) configuration; and
   a processor that determines one or more SRS resources for partial frequency sounding or full frequency sounding based on the configuration information,
   wherein the processor precodes, based on an SRS request field in downlink control information (DCI), an SRS in an SRS transmission using the SRS resource for the partial frequency sounding,
   wherein the processor does not precode, based on the SRS request field in the DCI, an SRS in an SRS transmission using the SRS resource for the full frequency sounding, and
   wherein the processor switches, based on the SRS request field in the DCI, between the full frequency sounding and the partial frequency sounding.

2. The terminal according to claim 1, wherein the SRS resource for the partial frequency sounding is associated with a channel state information reference signal (CSI-RS) resource.

3. A radio communication method for a terminal, comprising:
   receiving, via higher layer signaling, configuration information for a sounding reference signal (SRS) configuration; and
   determining one or more SRS resources for partial frequency sounding or full frequency sounding based on the configuration information,
   wherein an SRS is precoded, based on an SRS request field in downlink control information (DCI), in an SRS transmission using the SRS resource for the partial frequency sounding,
   wherein the SRS is not precoded, based on the SRS request field in the DCI, in an SRS transmission using the SRS resource for the full frequency sounding, and
   wherein a switching between the full frequency sounding and the partial frequency sounding is performed based on the SRS request field in the DCI.

4. A system comprising a terminal and a base station, wherein the terminal comprises:

a receiver that receives, via higher layer signaling, configuration information for a sounding reference signal (SRS) configuration; and a processor that determines one or more SRS resources for partial frequency sounding or full frequency sounding based on the configuration information, wherein the processor precodes, based on an SRS request field in downlink control information (DCI), an SRS in an SRS transmission using the SRS resource for the partial frequency sounding, wherein the processor does not precode, based on the SRS request field in the DCI, an SRS in an SRS transmission using the SRS resource for the full frequency sounding, and wherein the processor switches, based on the SRS request field in the DCI, between the full frequency sounding and the partial frequency sounding, and the base station comprises:

a transmitter that transmits the configuration information and the DCI; and a processor that controls reception of the SRS.

5. A base station comprising:

a transmitter that transmits, to a terminal, configuration information for a sounding reference signal (SRS) configuration via higher layer signaling and downlink control information (DCI), the configuration information configuring one or more SRS resources for partial frequency sounding or full frequency sounding, and the DCI including an SRS request field used to switch between the full frequency sounding and the partial frequency sounding by the terminal; and a processor that controls reception of an SRS that is precoded based on the SRS request field in the DCI, when an SRS transmission using the SRS resource for the partial frequency sounding is performed by the terminal, wherein the processor controls reception of an SRS that is not precoded based on the SRS request field in the DCI, when an SRS transmission using the SRS resource for the full frequency sounding is performed by the terminal.

* * * * *